United States Patent [19]

Bennett

[11] Patent Number: 4,941,673
[45] Date of Patent: Jul. 17, 1990

[54] EXERCISE DEVICE

[76] Inventor: Sam H. Bennett, 4930 S. 5th St. W., Idaho Falls, Id. 83401

[21] Appl. No.: 309,216

[22] Filed: Feb. 13, 1989

[51] Int. Cl.⁵ .............................. B62M 1/12; B62D 9/02
[52] U.S. Cl. .............................. 280/112.2; 280/242.1
[58] Field of Search ............... 280/220, 222, 242.1, 280/244, 772, 112.2, 112.2, 242.1; 272/72, 73

[56] References Cited

U.S. PATENT DOCUMENTS

| 305,053 | 9/1884 | Cumming | 280/243 |
|---|---|---|---|
| 348,619 | 9/1886 | Courtney | 280/243 |
| 853,091 | 5/1907 | Klinge | 280/1.11 |
| 1,222,613 | 4/1917 | Felicetti | 280/1.11 |
| 1,529,012 | 1/1924 | Crawford | 280/243 |
| 1,845,044 | 2/1927 | Curry | 280/220 |
| 2,012,683 | 8/1930 | Johnson | 280/243 |
| 2,965,388 | 12/1960 | Dettwiler | 280/112.2 |
| 3,704,027 | 11/1972 | Laudadio | 280/112.2 |
| 4,126,329 | 11/1978 | Tchernyak | 280/220 |
| 4,132,435 | 1/1979 | Wilson | 280/112.2 |
| 4,508,358 | 4/1985 | Erel | 280/234 |
| 4,600,216 | 7/1986 | Burkholder | 280/112.2 |
| 4,624,469 | 11/1986 | Bourne, Jr. | 280/112.2 |
| 4,632,414 | 12/1986 | Ellefson | 280/246 |
| 4,639,007 | 1/1987 | Lawrence | 280/234 |
| 4,700,962 | 10/1987 | Salmon | 280/220 |
| 4,740,004 | 4/1988 | McMullen | 280/112.2 |

Primary Examiner—Richard A. Bertsch
Attorney, Agent, or Firm—Hopkins, French, Crockett, Springer & Hoopes

[57] ABSTRACT

An exercise vehicle is provided with excellent stability in turns and realistic rowing motion for propulsion. An operator sits on a moveable seat with his feet straddling a drive member which is moved in a forward and backward plane for propulsion, while grasping steering handles at the end of the drive member. A front axle is pivoted between a pair of inclined planes against which the axle bears, pushing down the frame during a turn to induce a sideways cant of the frame when turning. The device may be used either indoors or outdoors to provide conventional rowing motion for exercise and pleasure.

14 Claims, 4 Drawing Sheets

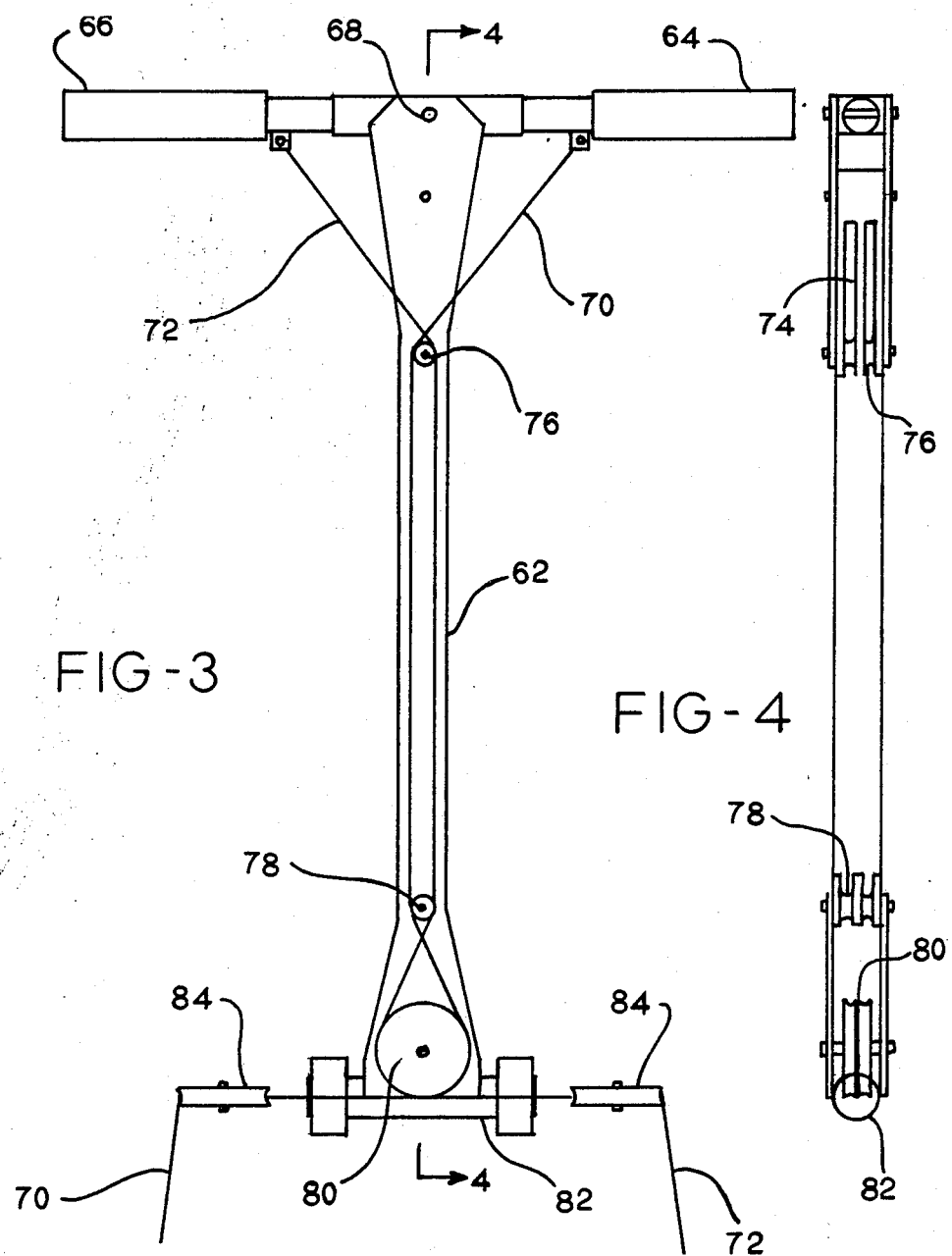

EXERCISE DEVICE

BACKGROUND OF THE INVENTION

Various exercise devices have become increasingly popular in recent years as physically active people continue the eternal search for the perfect exercise device. For example, numerous types of stationary exercise bicycles, having all manner of sophisticated resistance generating and measuring devices, have been commercially successful. Additionally, a number of stationary rowing machines for use in the home have been marketed and sold—it being popularly believed that the rowing motion offers a broader range of exercise to more muscle groups than does, for instance, a stationary bicycle.

However, as is readily evidenced by the large numbers of persons actively jogging outdoors, many people consider an exercise regime limited solely to indoor activity (such as is required by stationary bicycles and rowing machines) unduly limiting. Therefore, a number of rowing-type vehicles which are intended for outdoor use, have been proposed. As early as 1884, as illustrated by U.S. Pat. No. 305,053 a rowing-type motion on oar-like levers was used to propel the vehicle. Later, as evidenced by U.S. Pat. Nos. 348,619, 1,845,044 and 2,012,683 the oar-like apparatus was replaced with a strap or cable device which was operatively connected to a drive wheel to provide locomotion. In these devices, the weight of the apparatus (with the person thereon) provided sufficient resistance to movement to effect the exercise desired. The strap or cable was affixed to a handle which was drawn up to the exerciser's chest to produce the rowing motion. A more sophisticated three-wheeled device simulating actual rowing motion is disclosed in U.S. Pat. No. 4,126,329, wherein the rowing motion causes back-and-forth movement of an endless belt, which is geared to the drive wheels. U.S. Pat. Nos. 632,414 and 4,639,007 illustrate a departure from prior rowing machines in that they utilize a pivoting rowing post rather than oar-type members to effect locomotion. For instance, in the '414 patent, the rowing post is interconnected to a rear-drive wheel by a cable wrapped about a ratcheting sprocket. The device is turned by foot-operated pedals interconnected to the front wheels by steering cables. The '007 patent discloses an exercise device having both foot and hand propulsion systems. The hand propulsion system is a telescoping steering column which telescopes for forward and backward movement. The device is steered by rotating the steering column about its longitudinal axis.

The various devices noted above have preformed adequately for their intended purpose, however they have failed to realize the full potential of such vehicles. For example, when operating such vehicles at speeds of up to 35 mph, such vehicles are inherently unsteady during a turn even though they are built low to the ground. It would be advantageous to have the vehicle cant into the turns in order to increase the possible safe speed through corners as well as reduce the likelihood of rollover. Also, a rowing post which is the prime source of locomotion and which is easily manipulated in turning the device would be desirable.

SUMMARY OF THE INVENTION

The exercise apparatus of the present invention comprises a longitudinal frame member having a central longitudinal axis therethrough. The frame is provided with a plurality of wheels, preferably two front steering wheels and a single rear drive wheel. A drive member in the form of a post is pivotally affixed to the frame at the location of the longitudinal axis for forward and rearward movement. Steering handles are pivotally affixed to the upper end of the drive member, the steering handles being interconnected to opposite sides of the front axle by steering cables. The drive member is interconnected with a drive cable to a chain which interfits and drives a sprocket on the rear wheel. The drive chain is connected to a spring so that after a drive stroke, when the drive member is returned to a forward position, the drive chain is repositioned for the next drive stroke. The front axle is pivotally connected to the frame at the location of an inclined plane against which the axle bears during a turning sequence. As one side of the axle moves rearwardly during a turn, the axle remains horizontal but bears against the upwardly sloping inclined plane, thereby pushing down that side of the inclined plane, and concurrently that side of the frame. Therefore, the entire frame is canted into the turn as the axle is turned. Applicant has found that the preferred angle of the inclined plane is a slope of about 30° relative to the frame in a forward and downward direction. Such an incline will induce a maximum sideways cant of the frame during a turn of about 15-20°.

The device of this invention is propelled by the forward and backward rowing motion of the drive member, which is straddled by the operator during use. A conventional sliding/rowing seat is provided to insure realistic rowing motion. The device may be used either indoors or outdoors, but should always be used where automobile traffic is not to be encountered.

BRIEF DESCRIPTION OF THE DRAWINGS

FIG. 3 is a sectional view of the drive member of the present invention;

FIG. 4 is a sectional view of the drive member taken along lines 4—4 of FIG. 3;

DETAILED DESCRIPTION OF INVENTION

Figure 1:
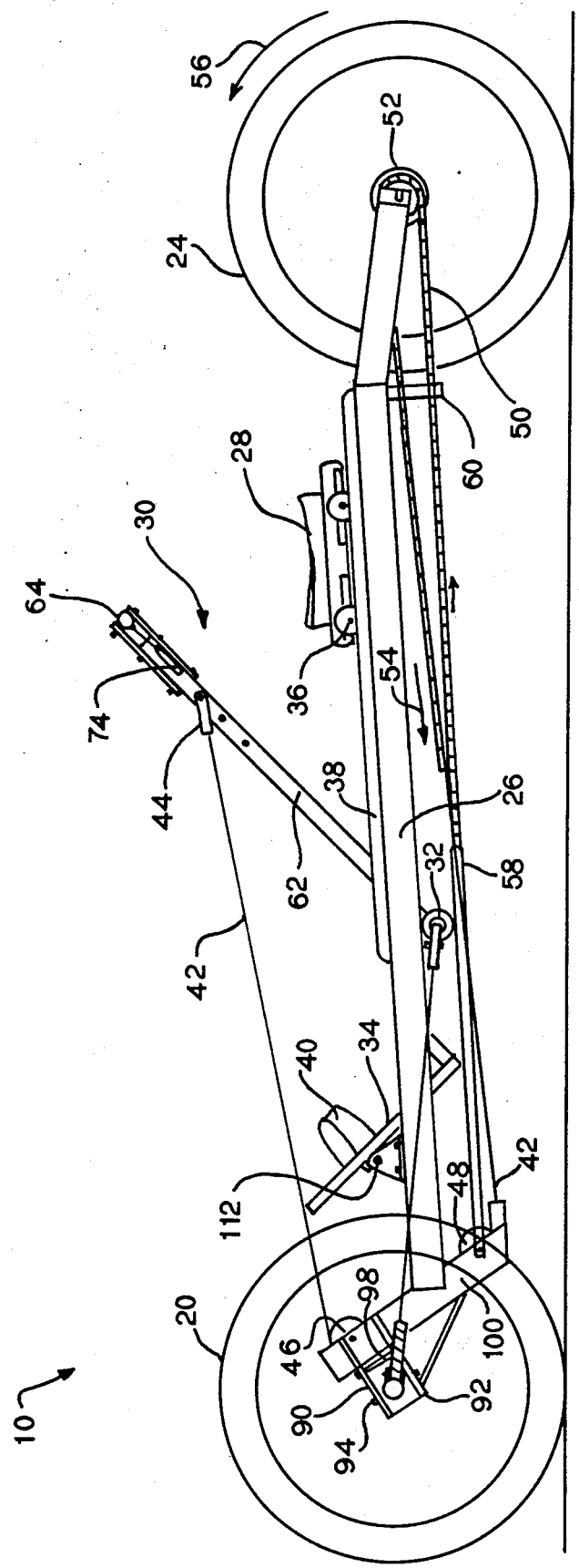
FIG. 1 is a side view of the apparatus of the present invention.

The apparatus of the present invention, generally designated 10 in FIG. 1, comprises a pair of front wheels 20, 22, a rear wheel 24 interconnected by frame 26 upon which slides a seat member 28. Locomotion and steering are provided by a rowing/steering post, generally designated 30 which is pivotally connected to the frame 26, as at 32. As illustrated in the figures, the real wheel 24 is the drive wheel for the apparatus 10, while the front wheels 20, 22 are the steering wheels. A foot rest 34 is affixed to the frame 26 so as to provide a point against which the rowing motion may be made.

As in conventional shells, the seat member 28 is provided with wheels 36 which travel longitudinally along the frame member within tracks 38. When sitting upon the seat 28, a user straddles the rowing/steering post with one foot in each of the foot restraints 40 of footrest 34.

The post 30 provides the locomotion for the apparatus of this invention. A drive cable 42 is affixed to the post 30, as by collar 44. The cable is directed forwardly from the post 30 about a first pulley 46 and thence downwardly about a second pulley 48. The drive cable 42 then is directed rearwardly to the drive wheel 24. The drive cable 42 is affixed to a drive chain 50 which is directed about a rear-drive sprocket 52 in conventional driving engagement. Therefore, a rearward "pulling" motion of the post 30 causes the drive chain 50 to move in the direction of arrow 54, thereby causing rotational movement of drive wheel 24 in the direction of arrow 56. In a forward return stroke of the post 30, drive chain 50 moves in a direction opposite that of arrow 54 as it is retracted within housing 58 by a spring member (not shown) which is stretched by the previous drive stroke. The spring within housing 58 is provided with sufficient tension to maintain the drive chain securely about drive sprocket 52. The drive chain 50 may be retained within guide member 60 to insure proper placement about sprocket 52. While not shown in the drawings, that portion of the drive cable 42 and drive chain 50 forward of the guide member 60 may be retained within housings similar to housing 58 so as to prevent entanglement with road debris or fouling by dirt, etc.

The post 30 comprises drive member 62 and the steering handles 64, 66. The drive member 62 pivots in a forward and backward plane which is coincident with a central longitudinal axis of the frame member 26. The steering handles 64, 66 pivot about a pivot point 68 in a plane generally perpendicular to the plane of the longitudinal axis defined by the drive member 62. A pair of steering cables 70, 72 affixed to steering handles 64, 66 cause the wheels 20, 22 to be turned when the handles are rotated about pivot point 68.

Figure 2:
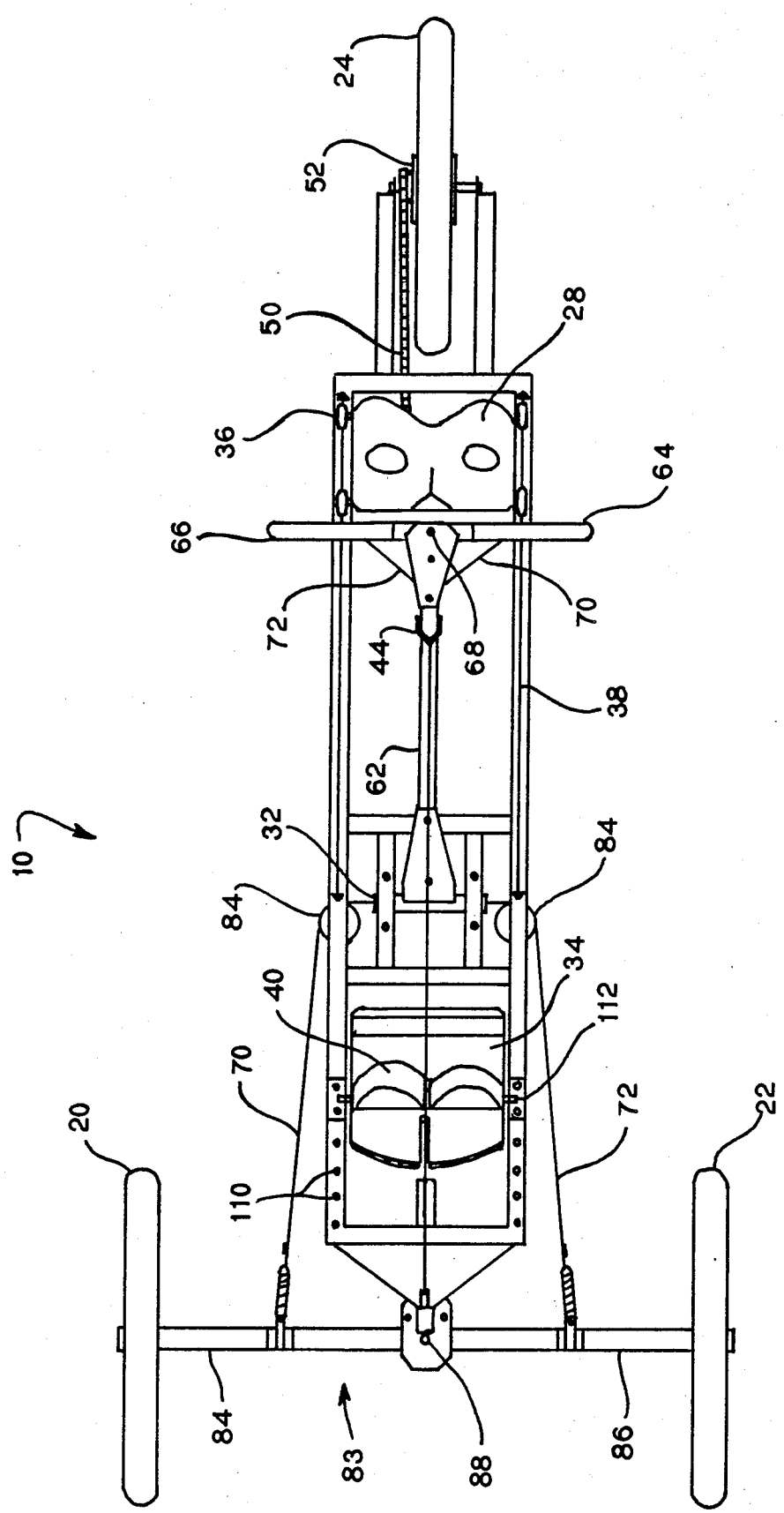
FIG. 2 is a top view of the apparatus of the present invention.

As shown more particularly in FIG. 3, steering cables 70, 72 enter the interior of drive member 62 through apertures 74 provided in each side of the drive member 62. As illustrated, the steering cables 70, 72 affixed to the steering handles 64, 66 are directed about a pair of first-upper 76 and lower 78 pulleys and thence about a large lower pulley 80 so as to reverse the side of the steering cable. Therefore, (as viewed by one sitting in seat 28) steering cable 70 affixed to the "left" steering handle 64 is securely affixed to the "right" front axle 84 associated with wheel 20, whereas the "right" steering cable 72 is affixed to the "left" front axle 86 associated with wheel 22. The steering cables are directed about the lower pulley 80 and centered within housing 82, whereupon they are directed to their respective wheel about pulleys 84. The steering cables 70, 72 are affixed to respective sides 84, 86 of the front axle by any conventional means. It will be noted from FIGS. 2 and 3 that when the handle 64 is pivoted downwardly or forwardly about pivot point 68, the handle 66 will move rearwardly, thereby pulling upon steering cable 72. Because cable 72 is "pulled", left wheel 22 will move rearwardly and right wheel 20 will move forwardly, both pivoting on axle 83 about pivot point 88. Therefore, when the left handle is moved down or forward, the vehicle will turn to the left, whereas when the right handle 66 is moved downwardly or forwardly, the vehicle will turn to the right.

As is evident from the drawings, the steering handles pivot within a plane at an angle to the plane within which the post 30 pivots. The particular angle will depend upon the point during the drive stroke of post 30 when the handles are pivoted for a turn.

Figure 5:
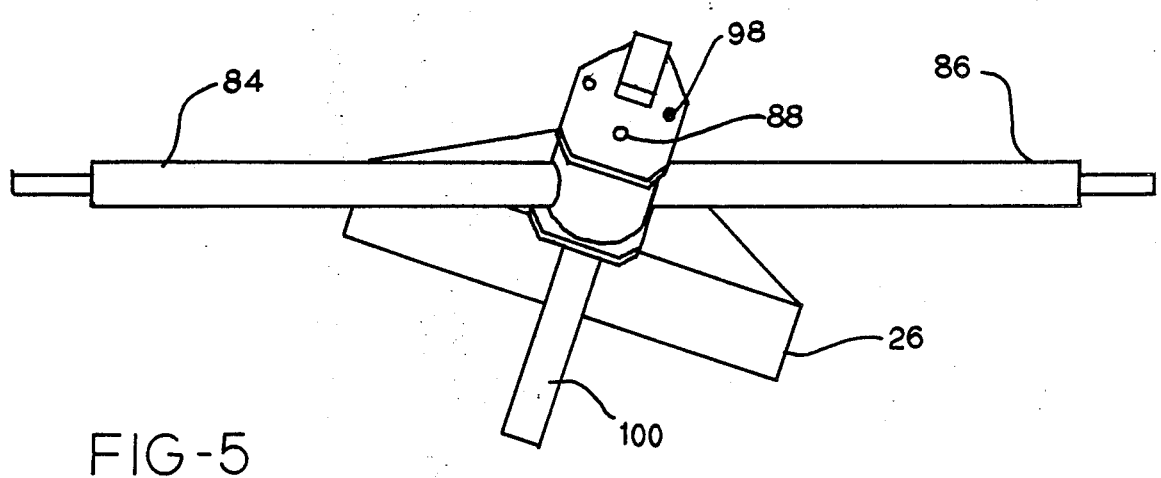
FIG. 5 is a schematic representation of the apparatus of the present invention in a left-hand turn.
Figure 6:
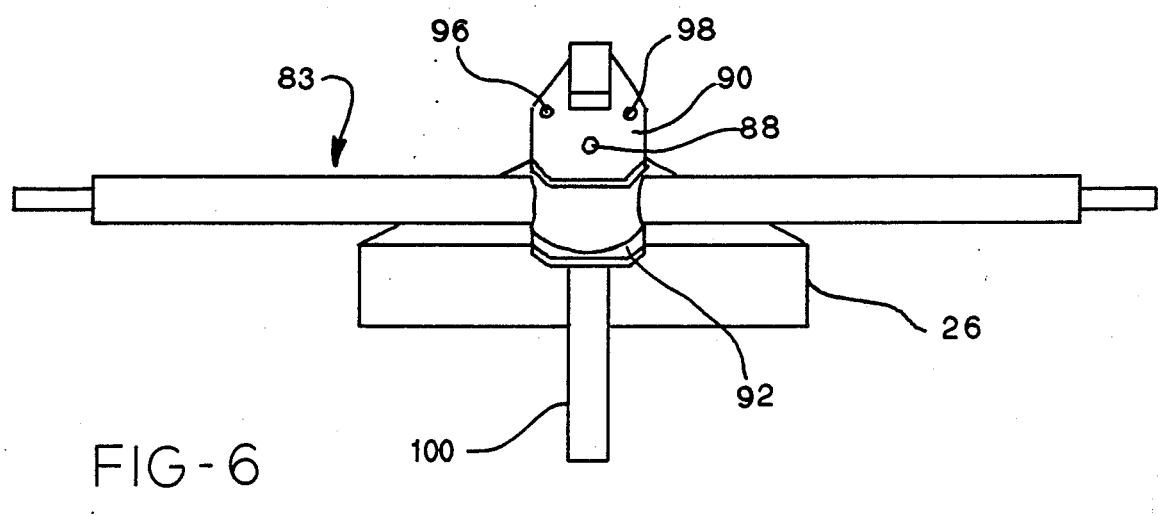
FIG. 6 is a schematic representation of the apparatus of the present invention while not turning.
Figure 7:
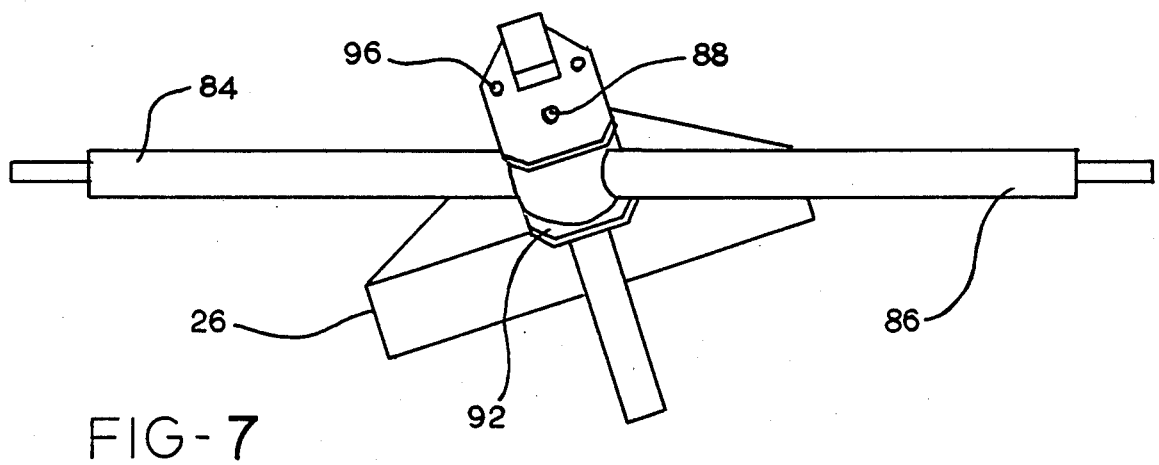
FIG. 7 is a schematic representation of the apparatus of the present invention making a right-hand turn.

A critical feature of the present invention is illustrated in the sequence of FIGS. 5-7. These figures illustrate the unique ability of the apparatus of the present invention to "cant" into a turn. As illustrated schematically in FIG. 6, the apparatus of the present invention is moving straight on a level surface, whereas FIG. 5 illustrates a turn to the left (as viewed by the driver) and FIG. 7 illustrates a turn to the right (as viewed by the driver). Referring to FIG. 6, the frame 26 is positioned relatively horizontally to the ground surface. In actuality, Applicant has found that a slight "forward" tilt of the frame (as seen more easily in FIG. 1) of about 4° is preferable, in order to give the driver a better view ahead of the vehicle, as well as making it easier for the driver sitting upon seat 28 to return to the forward-most position so as to effect a power or drive stroke rearwardly. The unique steering means comprises upper 90 and lower 92 plates between which is pivoted the front axle about pivot point 88. The pivot point 88 comprises a pin 94 which is provided through the axle 83. Stop members 96, 98 limit the rearward rotational movement of the axle 83 about pivot point 88. The upper and lower plates 90, 92 are affixed to a forward frame extension 100 (FIG. 1) so that the planar surfaces of the plates 90, 92 are at an angle of between about 25°–40° from horizontal. Most preferably, the angle of the plates 90, 92 is about 30° from the plane of the frame 26 which, being at an angle of about 4° from horizontal, indicates a preferable alignment of the plates 90, 92 at an angle of about 34° from horizontal.

It will be seen from FIGS. 5 and 7 that when the front steering axle and wheels are turned, the frame will be canted into the turn. For example, as illustrated schematically in FIG. 5, if the steering handle 64 is moved downwardly or forwardly, steering cable 72 is moved rearwardly, thereby causing axle portion 86 and wheel 22 to be moved rearwardly. Because the front steering wheels 20, 22 always remain in contact with the ground surface the axle portions 84, 86 remain in a constant near-horizontal alignment. Therefore, as the axle portion 86 is moved rearwardly, it is in contact with the inclined planes (plates 90, 92) thereby forcing down that side of plates 90, 92 on the side of the rearwardly moving axle portion 86. The other axle portion 84 moves forwardly out of engagement with the inclined planes 90, 92. As illustrated in FIG. 5, the frame 26 is canted downwardly on the side of the turn.

In the same manner, a right-hand turn is effected by pivoting the steering handle 66 downward or forward, thereby moving rearward the steering handle 64, and "pulling" on steering cable 70. Therefore, the axle portion 84 and wheel 20 are moved rearwardly, as illustrated schematically in FIG. 7. As the axle 83 pivots about pivot point 88, axle portion 84 moves rearwardly, and bears against lower plate 92, pushing down on the side of plate 92 of rearwardly moving axle portion 84. The frame 26 is therefore canted downwardly on that side.

As illustrated, the axle portions 84, 86 pivot between the inclined plates 90, 92 at pivot point 88; excessive rearward movement of the axle is prevented by the stop members 96, 98 against which the axle will bear, limiting the radius of the turn possible with the apparatus. Furthermore, the placement of the stop members 96, 98 will determine the sideways canting of the frame as illustrated in FIGS. 5 and 7. The further back the stop member is located, the greater the possible cant of the frame into a turn. Applicant has found that the preferred maximum side canting when turning is from about 15°–20°, and most preferably about 18°.

It will be noted that the only portion of the apparatus which always remains in a generally horizontal orientation is the front axle and the two front wheels. Otherwise, when the apparatus is turned, the entire frame, including the rear wheel 24 is canted at the appropriate angle.

In operation, an individual sits upon the seat 28 and straddles the drive member 62 with one foot in each of the foot restraints 40 of footrest 34. The footrest is adjustable forward and back in a number of apertures 110, and is capable of pivoting about pin 112. By pressing against the footrest 34, and pulling rearwardly on the steering handles 64, 66 as the seat 28 slides to the rear and the operator's legs are extended, a power stroke is applied to the rear wheel and the apparatus is propelled forward. By pivoting the steering handles 64, 66 about pivot point 68, at any point during a power or return stroke of the drive member 62, the device will be turned, and the frame canted.

While not critical to the operation of the present invention, the apparatus may be provided with a brake member (not shown) of conventional design. A hand brake may be provided in conjunction with one or both of the steering handles 64, 66 interconnected to a brake drum, as for instance adjacent the drive sprocket 52. Likewise, a multi-gear transmission assembly, either automatically or manually shifted, may be provided. As such devices are well known structures available from a number of manufacturers, and utilized herein as on a three-speed bicycle, they are not described in detail.

The apparatus of the present invention is intended for use in the outdoors—that is, on sidewalks, jogging paths, parking lots, tracks and other locations where automobile traffic is not encountered. As the driver's attention is directed toward the propulsion and turning of this apparatus, and because this apparatus is constructed quite low to the ground, it is not contemplated for use on public roadways where automobile drivers may have difficulty seeing and avoiding drivers of this device. During inclement weather, or at any other time when outdoor use is not desired, the front wheels of this device may be blocked and the rear wheel suspended on one or more resistive rollers to provide indoor exercise of a type otherwise available during use of the apparatus outdoors. Apparatus providing resistance to the rear wheel are well known in the art and typically used with bicycles for indoor, stationary exercise.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

I claim:

1. An exercise apparatus comprising:
   a. a frame member having a front-to-back longitudinal axis;
   b. at least three wheels affixed to the frame;
   c. a rowing post moveably affixed to the frame and providing locomotion to the wheels when moved in a first plane aligned along the longitudinal axis;
   d. steering handles affixed to the rowing post and adapted to pivot in a second plane which includes the rowing post and at an angle to the longitudinal axis; and
   e. means to cant the frame when the apparatus is turned, comprising a forwardly and downwardly angled inclined plane having a front axle pivoted thereon such that movement of the axle upon the inclined plane causes canting of the frame.

2. The apparatus as recited in claim 1, wherein the device is provided with two front and one rear wheel.

3. The apparatus as recited in claim 1, wherein the rowing post is geared to the rear wheel so as to provide locomotion when rowed in the front-to-back first plane.

4. The apparatus as recited in claim 1, wherein the steering handles can be pivoted independently of any movement of the rowing post, such that the apparatus may be turned by pivoting the steering handles at any point in the front-to-back movement of the rowing post.

5. The apparatus as recited in claim 4, wherein the steering handles are interconnected to a front axle having a wheel at each end thereof.

6. The apparatus as recited in claim 1, wherein the means to cant the frame is aligned at an angle of between about 25° to about 40° to the horizontal, such that when the axle is pivoted thereon, the frame is canted at an angle of between about 15° and 20° from horizontal.

7. The apparatus as recited in claim 6, wherein the means to cant the frame is aligned at an angle of 34° to horizontal, and the frame is canted during a turn at an angle of less than about 18°.

8. An exercise apparatus having a frame and at least three wheels and comprising:
   a generally horizontal steering axle having a pivot point adjacent an inclined plane affixed to the frame such that when the axle is pivoted in a horizontal plane against the inclined plane, and the apparatus is steered into a turn, the frame is canted in the direction of the turn.

9. The apparatus as recited in claim 8, wherein the front steering axle is provided with a wheel at each end thereof.

10. The apparatus as recited in claim 8, wherein the inclined plane is inclined at an angle of between about 30° and about 35° from horizontal.

11. The apparatus as recited in claim 10, wherein when the frame is turned, the frame is canted at an angle up to about 20° from horizontal.

12. The apparatus as recited in claim 8, wherein the apparatus is propelled by a rowing post pivoted to the frame and positioned for front-to-back movement.

13. The apparatus as recited in claim 12, wherein the rowing post is interconnected to a rear wheel in driving engagement therewith.

14. The apparatus as recited in claim 12, wherein steering handles are pivotally affixed to the rowing post such that the steering handles pivot in a plane at an angle to the plane of movement of the rowing post.

* * * * *